United States Patent
Lobb et al.

(10) Patent No.: US 10,262,310 B1
(45) Date of Patent: Apr. 16, 2019

(54) GENERATING A VERIFIABLE DOWNLOAD CODE

(75) Inventors: Franklin L. Lobb, Bothell, WA (US); Sanjay Govindrao Kulkarni, Redmond, WA (US); Andrew McGoogan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1155 days.

(21) Appl. No.: 13/227,127

(22) Filed: Sep. 7, 2011

(51) Int. Cl.
*G06Q 20/12* (2012.01)

(52) U.S. Cl.
CPC .................. *G06Q 20/1235* (2013.01)

(58) Field of Classification Search
CPC .................................................. G06Q 2220/18
USPC .......................................................... 705/51
See application file for complete search history.

(56) References Cited

U.S. PATENT DOCUMENTS

| | | | | |
|---|---|---|---|---|
| 6,389,403 | B1* | 5/2002 | Dorak, Jr. ..................... | 705/52 |
| 2001/0051996 | A1* | 12/2001 | Cooper ................. | G06Q 10/10 709/217 |
| 2003/0200459 | A1* | 10/2003 | Seeman ....................... | 713/200 |
| 2004/0010470 | A1* | 1/2004 | Mills ............................ | 705/51 |
| 2006/0089912 | A1* | 4/2006 | Spagna ................... | G06F 21/10 705/51 |
| 2006/0170759 | A1* | 8/2006 | Roever et al. ............. | 348/14.03 |
| 2007/0027781 | A1* | 2/2007 | Seal et al. ..................... | 705/26 |
| 2007/0179893 | A1* | 8/2007 | Schull ........................... | 705/51 |
| 2007/0282749 | A1* | 12/2007 | Nonaka et al. ................ | 705/51 |
| 2008/0040505 | A1* | 2/2008 | Britto et al. .................. | 709/238 |
| 2008/0122624 | A1* | 5/2008 | Balinsky .............. | G06K 7/0008 340/572.1 |
| 2010/0083251 | A1* | 4/2010 | McCrory et al. ................. | 718/1 |
| 2010/0192210 | A1* | 7/2010 | Purdy, Sr. ............... | G06F 21/10 726/7 |
| 2011/0099376 | A1* | 4/2011 | Gupta ..................... | H04L 9/321 713/171 |
| 2011/0202670 | A1* | 8/2011 | Zheng .......................... | 709/228 |
| 2012/0084210 | A1* | 4/2012 | Farahmand ..................... | 705/64 |
| 2012/0173499 | A1* | 7/2012 | Walker ......................... | 707/704 |

* cited by examiner

*Primary Examiner* — Zeshan Qayyum

(74) *Attorney, Agent, or Firm* — Thomas | Horstemeyer, LLP

(57) ABSTRACT

Disclosed are various embodiments for generating a verifiable download authorization code. A computing device obtains a transaction identifier that corresponds to an acquisition of a digital product by a user. The computing device generates a download authorization code based at least in part on the transaction identifier.

20 Claims, 5 Drawing Sheets

GENERATING A VERIFIABLE DOWNLOAD CODE

BACKGROUND

Online merchants may allow a user to purchase a digital product such as a media title, music title, movie title, game title, etc. through an electronic commerce network site. One advantage of purchasing a digital product online is the ability to download the product for immediate consumption rather than waiting for a physical product to ship.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The various embodiments described herein relate to generating authorization codes used in downloading digital products, such as music, video, movies, games, software, etc. Acquisition of the digital product is accomplished in two separate two phases. The user first interacts with an electronic commerce merchant to perform an acquisition transaction. The acquisition by the user may take various forms, such as a purchase, a rental, a free offer, etc. At a later point in time, the user downloads the digital product in a separate and later transaction.

Various embodiments disclosed herein dynamically generate a download authorization code at the time that a user acquires the digital product from an electronic commerce network site, rather than using a pre-existing download authorization code that was created before acquisition of the product by the user. The dynamically generated download authorization code is based on the identifier of the transaction by which the user acquires the digital product, and is thus unique to the transaction. The download authorization code may also incorporate a value which is associated with the electronic commerce network site, and/or a particular merchant selling on the electronic commerce network site. This value can serve a non-repudiation function, so that the download server can be assured of the identity of the entity that generated the download authorization code.

The dynamically generated download authorization code is provided to the user, and the user provides this download authorization code to the download server in order to retrieve the digital product. The download server may perform processing on the download authorization code to authenticate the source of the download authorization code and/or to determine whether or not the download authorization code has been used before. In the following discussion, a general description of the system and its components is provided, followed by a discussion of the operation of the same.

Figure 1:
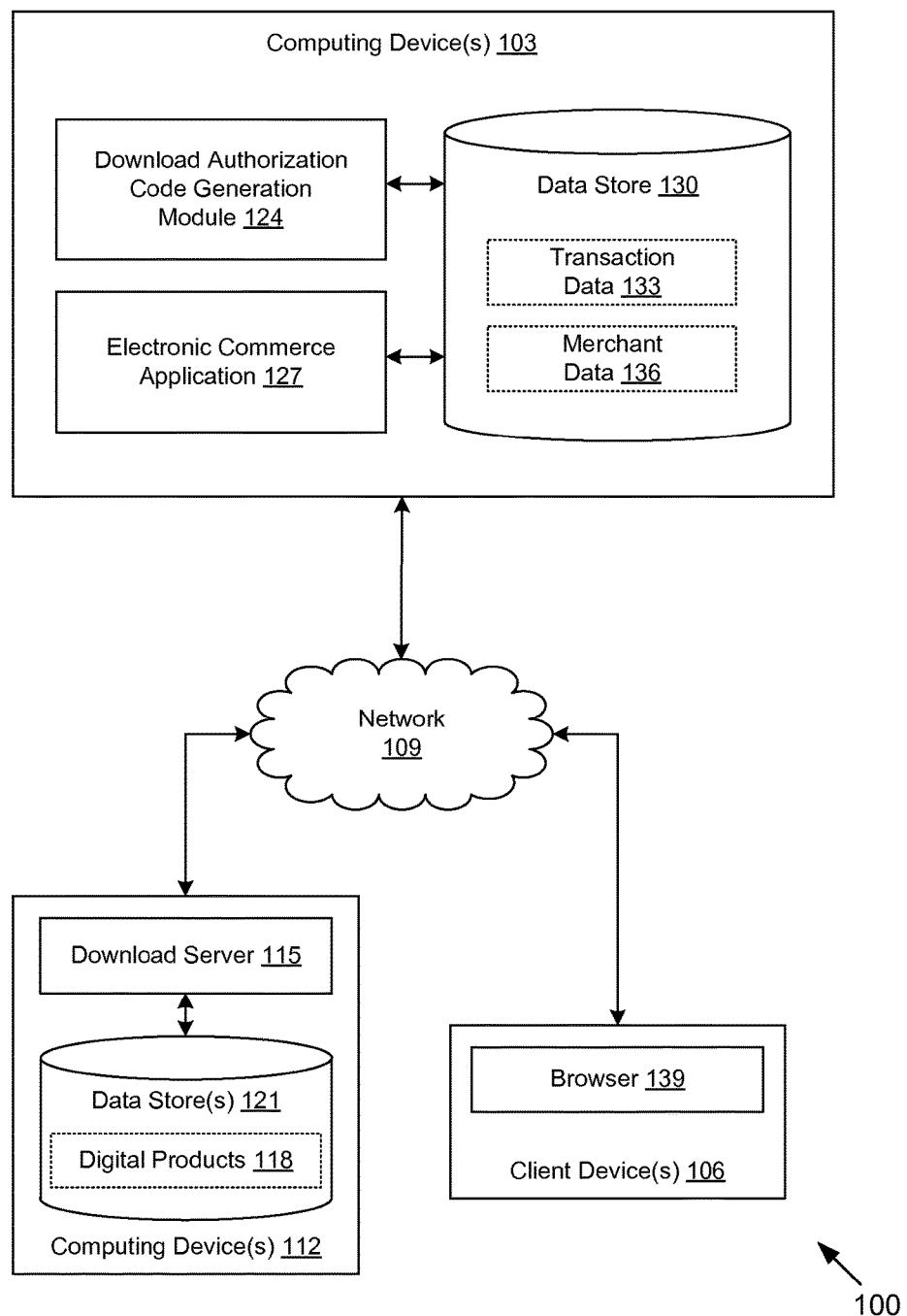
FIG. 1 is a drawing of a networked environment according to one embodiment of the present disclosure.

With reference to FIG. 1, shown is a networked environment 100 according to various embodiments. The networked environment 100 includes one or more computing devices 103 in data communication with one or more client devices 106 by way of a network 109. The computing device 103 is also in data communication with one or more computing devices 112 by way of the network 109. The network 109 includes, for example, the Internet, intranets, extranets, wide area networks (WANs), local area networks (LANs), wired networks, wireless networks, or other suitable networks, or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. A plurality of computing devices 103 together may comprise, for example, a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in various arrangements.

The computing device 112 may comprise, for example, a server computer or any other system providing computing capability. Alternatively, a plurality of computing devices 112 may be employed that are arranged, for example, in one or more server banks or computer banks or other arrangements. A plurality of computing devices 112 together may comprise, for example, a cloud computing resource, a grid computing resource, and/or any other distributed computing arrangement. Such computing devices 112 may be located in a single installation or may be distributed among many different geographical locations. For purposes of convenience, the computing device 112 is referred to herein in the singular. Even though the computing device 112 is referred to in the singular, it is understood that a plurality of computing devices 112 may be employed in various arrangements.

Various applications and/or other functionality may be executed in the computing device 112 according to various embodiments. The components executed on the computing device 112 include, for example, a download server 115, as well as may also include other applications, services, processes, systems, engines, or functionality not discussed in detail herein. The download server 115 is executed to service requests from a client to download digital products 118 that are stored in a data store 121. The data store 121 is accessible to the computing device 112 and may be representative of a plurality of data stores as can be appreciated.

The digital products 118 may include, for example, music, video, audio, podcasts, software, electronic games, or any other type of digital content. The client requesting the download may be, for example, a client device 106 in data communication with the download server 115 through the network 109.

Various applications and/or other functionality may be executed in the computing device 103 according to various embodiments. The components executed on the computing device 103 include, for example, a download authorization code generation module 124 and an electronic commerce application 127. The components executed on the computing device 103 may also include other applications, services, processes, systems, engines, or functionality not discussed in detail herein. These components may communicate with each other using various mechanisms, including but not limited to any type of middleware framework. Though the download authorization code generation module 124 is shown as logically separate from the electronic commerce application 127, in other embodiments the download authorization code generation module 124 and the electronic commerce application 127 may be integrated, as should be appreciated.

Also, various data is stored in a data store 130 that is accessible to the computing device 103. The data store 130 may be representative of a plurality of data stores as can be appreciated. The data stored in the data store 130, for example, is associated with the operation of the various applications and/or functional entities described below. The data stored in the data store 130 includes, for example, transaction data 133, merchant data 136 and potentially other data. The transaction data 133 includes data associated with electronic commerce transactions, for example, a transaction identifier, a transaction time, a merchant involved in the transaction, a network site performing the transaction, etc. The merchant data 136 includes data associated with merchants involved in electronic commerce transactions, for example, a merchant identifier, a merchant name, a merchant place of business, a list of one or more electronic commerce sites through which the merchant sells products, etc.

The electronic commerce application 127, if present, is executed in order to facilitate the online viewing and/or purchase of items and products over the network 109. The electronic commerce application 127 also performs various backend functions associated with the online presence of a merchant in order to facilitate the online purchase of items, as should be appreciated. For example, the electronic commerce application 127 may generate network pages or portions thereof that are provided to client devices 106 for the purposes of selecting digital products for purchase, rental, download, lease, or other forms of consumption. In some embodiments, the electronic commerce application 127 is associated with a network site that implements an electronic marketplace in which multiple merchants participate.

The download authorization code generation module 124 is executed to dynamically generate a download authorization code associated with an acquisition transaction for a digital product. As will be further explained below, the download authorization code is based on a transaction identifier, and is therefore unique to the transaction. In some embodiments, the download authorization code also limits the user who acquired the digital product to a single download of the product.

Having discussed the computing device 103 and the computing device 112, the client device 106 will now be considered. The client device 106 is representative of a plurality of client devices that may be coupled to the network 109. The client device 106 may comprise, for example, a processor-based system such as a computer system. Such a computer system may be embodied in the form of a desktop computer, a laptop computer, a personal digital assistant, a cellular telephone, a smartphone, a set-top box, a television, a music player, a video player, a media player, a web pad, a tablet computer system, a game console, an electronic book reader, or other devices with like capability. The client device 106 may be configured to execute various applications such as a browser 139. The client device 106 may be configured to execute applications beyond the browser 139 such as, for example, email applications, messaging applications, and/or other applications.

Figure 2:
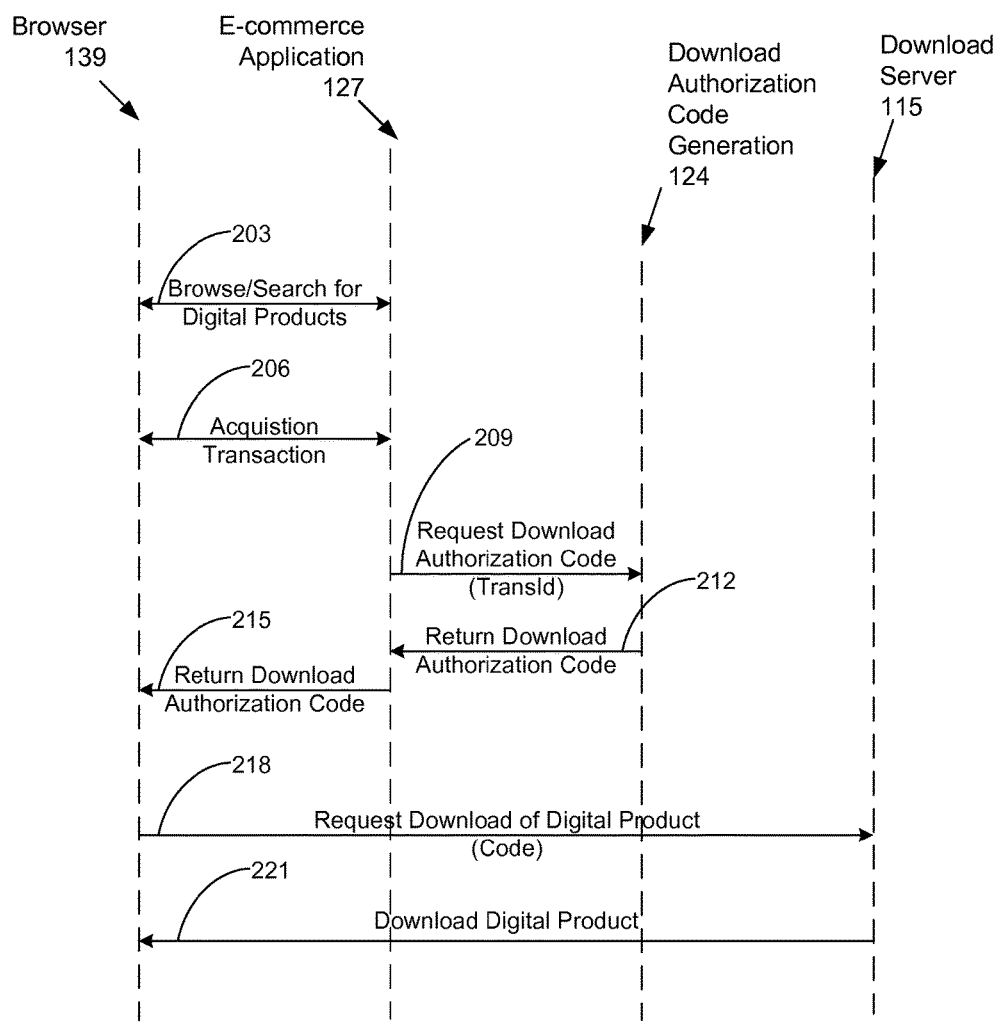
FIG. 2 is a block diagram illustrating various interactions between some of the components in the networked environment of FIG. 1 according to various embodiments of the present disclosure.

Turning now to FIG. 2, a general description of the operation of the various components of the networked environment 100 is provided. To begin, at step 203, a user interacts with an electronic commerce application 127 through an application on a client device 106, for example, a browser 139. The user may, for example, browse an electronic catalog, search an electronic catalog for products matching a search query, or go directly to a particular product page. Through this interaction with the electronic commerce application 127, the user selects a particular digital product 118 for acquisition. Having selected a digital product 118, the user begins an acquisition transaction at step 206. The acquisition may take the form of a purchase, a lease, a rental, a free offer, a free offer contingent upon purchase of another product, etc. The transaction may involve steps such as providing payment information, as should be appreciated. The purchase may also involve obtaining additional information from the user about the device which will be used to consume the digital product 118. For example, the electronic commerce application 127 may obtain information about the video and/or audio decoders supported by the client device 106, file formats supported by the client device 106, the operating system used by the client device 106, etc. The electronic commerce application 127 may also obtain information about the network connection to the client device 106, such as the connection type, available bandwidth, etc.

Notably, the complete process of acquiring the digital product 118 involves two parts. The user first completes the acquisition transaction, and then downloads the digital product 118. The download of the digital product 118 is separate from and subsequent to the acquisition transaction. In some embodiments, the entity implementing the electronic commerce application 127 and the entity hosting the download are separate. Since the download is separate from the acquisition transaction, the user is provided with a download authorization code which shows that the electronic commerce application 127 has authorized the user to obtain the digital product 118 from the download host.

A download authorization code is therefore dynamically generated as part of the acquisition process. In this regard, at step 209 the electronic commerce application 127 requests a download authorization code from the download authorization code generation module 124. Along with the request, the electronic commerce application 127 provides a transaction identifier which was dynamically generated by the electronic commerce application 127.

In response to the request at step 209, the download authorization code generation module 124 dynamically generates a download authorization code that is based on the acquisition transaction. The download authorization code is also unique to the transaction. In some embodiments, the download authorization code is also based on the particular merchant, electronic commerce network site, or electronic commerce application 127 that was a party to the transaction. Further details of the code generation process will be discussed below. At step 212 the electronic commerce application 127 provides the dynamically generated download authorization code to the electronic commerce application 127. At step 215 the electronic commerce application 127 in turn provides the download authorization code to the user.

At some later point in time, the user completes the process of acquiring the digital product 118. At step 218 the user begins the download process for the acquired digital product 118 by requesting download of the digital product 118 from a download server 115. The request may be implemented, for example, by accessing a particular network page hosted by the download server 115, where this network page was provided to the user by the electronic commerce application 127 during the acquisition transaction. In other embodiments, the user may browse the download server 115 and/or search the download server 115 for the acquired digital product 118. The download request at step 218 includes the download authorization code which the user obtained at step 215.

In response to the download request at step 218, the download server 115 processes the download authorization code and verifies that the code is valid. The download server 115 performs the inverse of the process used to generate the code. Thus, this process depends on the generation process used by the download authorization code generation module 124. In some embodiments, the processing performed by the download server 115 includes extraction of a verification value, which is used to authenticate the identity of the entity that generated the code and/or that performed the acquisition transaction. In some embodiments, the processing performed by the download server 115 includes determining whether this particular download authorization code has already been used, and if so, refusing the download request. Finally, at step 221 the download server 115 fulfills the download requested by the user at step 221, and at this point the user may view, play, execute, or otherwise consume the digital product 118.

Figure 3:
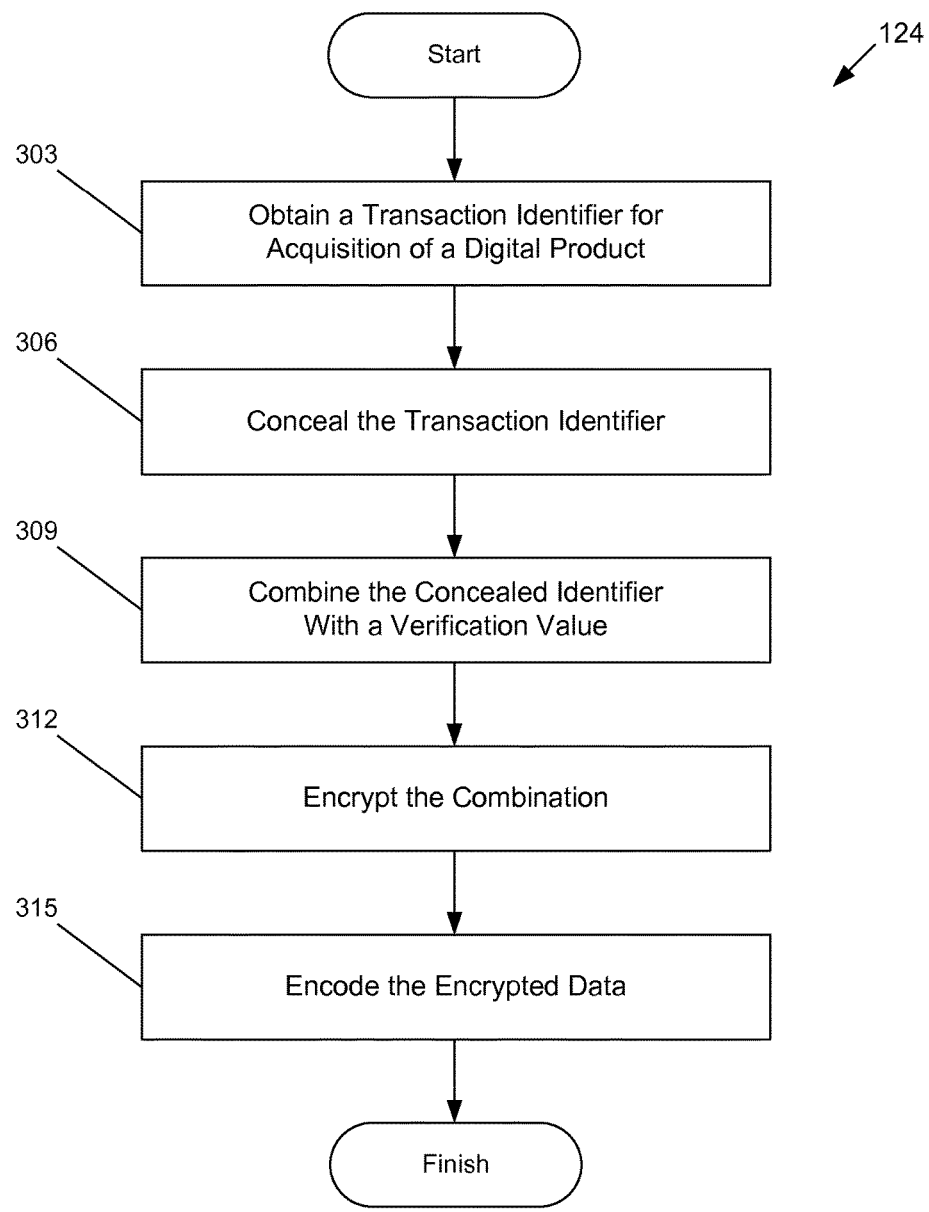
FIG. 3 is a flowchart illustrating an example of functionality implemented as portions of download authorization code generating code executed in a computing device in the networked environment of FIG. 1 according to various embodiments of the present disclosure.

With reference now to FIG. 3, shown is a flowchart that provides one example of the operation of portion(s) of the download authorization code generation module 124 according to various embodiments. It is understood that the flowchart of FIG. 3 provides merely an example of the many different types of functional arrangements that may be employed to implement the operation of portion(s) of the download authorization code generation module 124 as described herein. As an alternative, the flowchart of FIG. 3 may be viewed as depicting an example of steps of a method implemented in the computing device 103 (FIG. 1) according to one or more embodiments.

Beginning at box 303, the download authorization code generation module 124 obtains a transaction identifier that corresponds to the acquisition of a digital product by a user. In some embodiments, the transaction identifier is obtained by requesting the transaction identifier from the electronic commerce application 127 (FIG. 1). In other embodiments, the electronic commerce application 127 provides the download authorization code generation module 124 with transaction identifiers as transactions occur, and in such embodiments, the transaction identifier is retrieved from transaction data 133 in the data store 130.

Next, at box 306, the download authorization code generation module 124 conceals the transaction identifier in some manner. Such concealment may be desired when the entity providing the download of the digital product is separate from the entity generating the download authorization code, since in such scenarios sharing of a private transaction identifier would be undesirable. The concealment does not require that the entity using the download authorization code (e.g., the download server 115) be able to completely recover the transaction identifier, so a one-way concealment mechanism may be used. In some embodiments, the mechanism used for concealment is hashing, which allows partial recovery of the transaction identifier as should be appreciated. Hashing algorithms based on cyclic redundancy check codes, checksums, non-cryptographic hash functions, or cryptographic hash functions may be used, as should be appreciated. A non-exhaustive list of cryptographic hash functions is: Message Digest 4 (MD4); Message Digest 5 (MD5); Secure Hash Algorithm 1 (SHA-1); and Secure Hash Algorithm 2 (SHA-2). In some hashing embodiments, the salt value used for the hash function is the time at which the transaction occurred, where the transaction time is stored in transaction data 133. Though not shown in FIG. 2, the concealed transaction identifier may be truncated before further use to reduce data storage and/or bandwidth requirements.

At box 309, the download authorization code generation module 124 combines the concealed transaction identifier produced at box 306 with a fixed and predetermined verification value. The combination may involve, for example, prefixing the concealed transaction identifier with the verification value, or concatenating the verification value onto the concealed transaction identifier. In some embodiments, the verification value is unique to the entity operating the electronic commerce application 127. That is, each electronic commerce network site is associated with its own verification value. In such embodiments, the entity using the download authorization code (e.g., the download server 115) to verify that the download authorization code originated from a particular electronic commerce application 127. In other embodiments, the verification value is uniquely associated with a particular digital product 118, for example, a particular album, song, movie, television series, etc. In still other embodiments, the verification value is uniquely associated with a predetermined subset of digital products 118. For example, if the digital product 118 is a music album, the verification value may be associated with all music albums by a particular artist, or a subset of music albums by that artist. As another example, if the digital product 118 is a television series, the verification value may be associated with all seasons of the television series, or a subset of seasons.

Next, at box 312, the download authorization code generation module 124 encrypts the combination produced at box 309. Various encryption algorithms may be used as should be appreciated. A non-exhaustive list of examples is: Blowfish; Advanced Encryption Standard (AES); and Data Encryption Standard (DES). The download authorization code generation module 124 does not rely on an encryption algorithm of a particular strength, so any suitable encryption algorithm may be used.

Next, at box 315, the download authorization code generation module 124 performs content encoding on the encrypted data produced at box 312 to produce a download authorization code. Content encoding ensures that the download authorization code will emerge unmodified when transported through systems or protocols which have special restrictions on the range of characters they will accept (e.g., ASCII only). A non-limiting list of examples is: the Base32 family of encoding schemes (such as RFC 4648 and z-base- 32), each of which uses a set of 32 symbols; and the Base64 family of encoding schemes (such as RFC 2045 and RFC 4648), each of which uses a set of 64 symbols. Depending on the types of systems involved, some embodiments of the download authorization code generation module 124 may not include content encoding, as should be appreciated. Having generated the download authorization code, the process of FIG. 3 is then complete.

The flowchart of FIG. 3 described one particular sequence for generating a download authorization code based on a transaction identifier. Specifically, the sequence described in connection with FIG. 3 involved concealing the transaction identifier, combining the concealed identifier with a verification value; encrypting the combination, and content encoding the encrypted data. However, it should be appreciated that other embodiments may combine these individual features in various ways, and even omit individual features.

Figure 4:
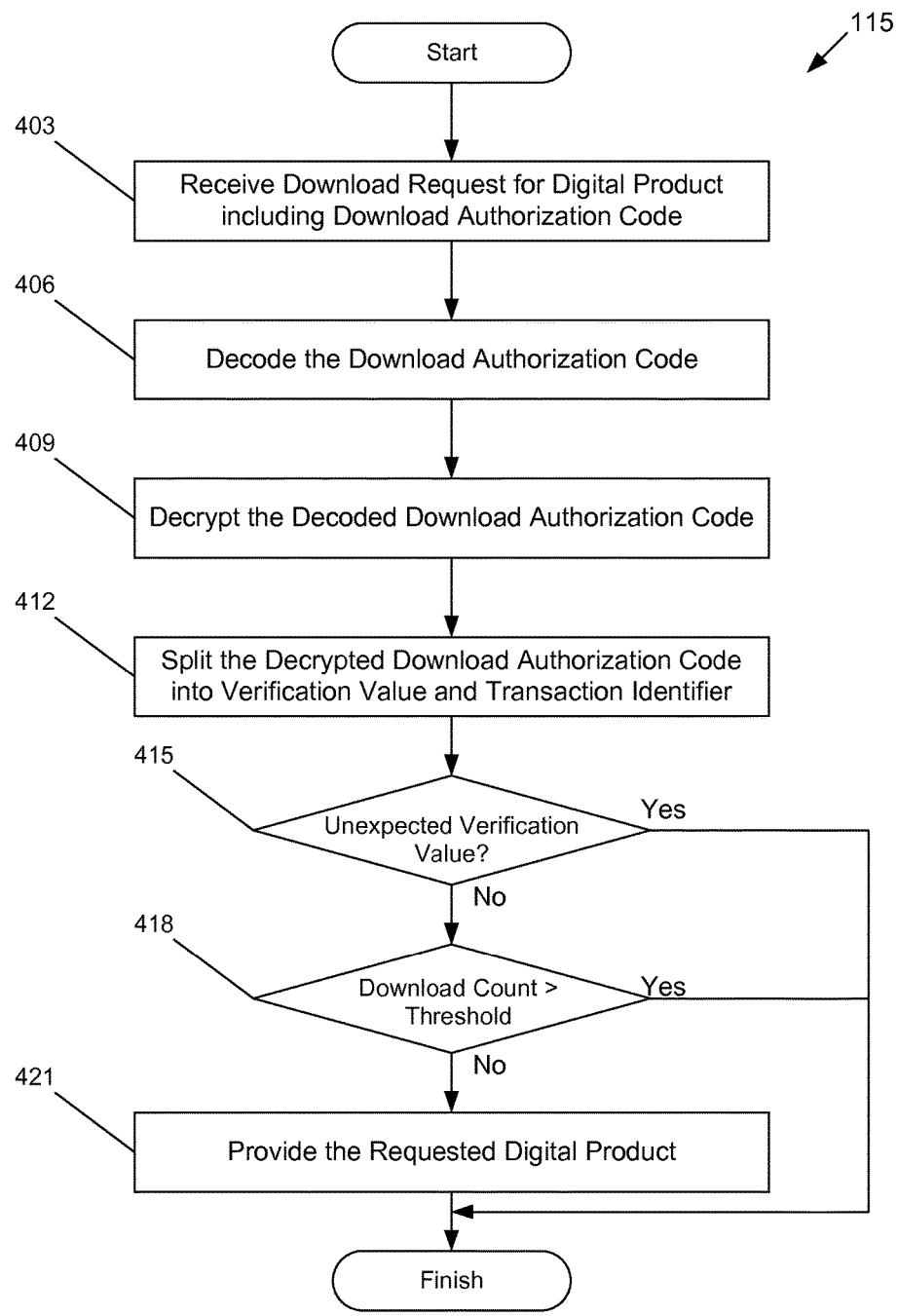
FIG. 4 is a flowchart illustrating an example of functionality implemented as portions of download server code executed in a computing device in the networked environment of FIG. 1 according to various embodiments of the present disclosure.

With reference now to FIG. 4, shown is a flowchart that provides one example of the operation of portion(s) of the download server 115 according to various embodiments. It is understood that the flowchart of FIG. 4 provides merely an example of the many different types of functional arrangements that may be employed to implement the operation of portion(s) of the download sever 115 as described herein. As an alternative, the flowchart of FIG. 4 may be viewed as depicting an example of steps of a method implemented in the computing device 112 (FIG. 1) according to one or more embodiments.

Beginning at box 403, the download server 115 receives a download request for a digital product 118. The download request is associated with a particular download authorization code. The download authorization code may be included in the download request itself or received by the download server 115 in a transaction related to the download request. As described earlier in connection with FIG. 2, the digital product 118 is one that the user has already acquired through an earlier acquisition transaction. During the acquisition transaction, the user was provided with a download authorization code, which was generated as described herein.

The download server 115 processes the download authorization code in a manner that is complementary to the process used to generate the download authorization code. The particular process described in FIG. 4 is complementary to the authorization code generation process described in FIG. 3. At box 406, the download server 115 begins the process of validating the received download authorization code by content decoding the received download authorization code. The functionality of box 406 complements the encoding process performed by the download code generation process at box 315. Next, at box 409, the download server 115 continues the validation process by decrypting the result produced at box 406. The functionality of box 409 complements the encrypting process performed by the download code generation process at box 312. The download server 115 uses a priori information to perform the decryption. The a priori information may include, for example, a previously shared key as should be appreciated.

Next, at box 412, the download server 115 splits the result produced at box 409 into a verification value and a transaction identifier. The split performs the inverse of the process used by the download authorization code generation module 124 to combine the verification value and the transaction identifier, as should be appreciated. For example, if the code was generated by prefixing the transaction identifier with the verification value, then the split at box 412 would extract the verification value from the beginning of the result produced at box 409. As another example, if the code was generated by concatenating the verification value onto the transaction identifier, then the split at box 412 would extract the verification value from the end of the result produced at box 409.

At box 415, the download server 115 determines whether the verification value extracted at box 412 is an unexpected value. For example, the download server 115 may check the extracted verification value against a list of known verification values. As described above, a verification value may correspond to a download code generating entity, an electronic commerce entity, a digital product 118, etc. If at box 415 it is determined that the extracted verification value is an expected value, then processing continues at box 418. On the other hand, if it is determined at box 415 that the extracted verification value is an unexpected value, the process of FIG. 4 completes without downloading the requested digital product 118. Under these conditions, the download server 115 may return an error code to the client which requested the download.

At box 418, having determined that the extracted verification value is an expected value, the download server 115 determines whether a download count associated with the digital product 118 and the requesting user has already reached a predetermined threshold. If the download count has not yet been reached, processing continues at box 421. On the other hand, if the download count has already been reached, the process of FIG. 4 completes without downloading the requested digital product 118. Under these conditions, the download server 115 may return an error code to the client which requested the download.

At box 421, having determined that the verification value is an expected value and the download count has not been reached, the download server 115 provides the digital product 118 to the requesting client. The current download count for the digital product 118 and the requesting user is incremented. If the download limit is one, the download server 115 may instead maintain a list of received download authorization codes, so that a subsequent download using the same code can be refused. In this manner, the download authorization code can be used to enforce a single-use download.

As noted above, at box 412 the download server 115 extracts a verification value and a transaction identifier from the decrypted result. The download server 115 can maintain a list of extracted transaction identifiers for audit purposes. Although a particular concealed transaction identifier has no meaning to the download server 115, such identifiers can be provided to the electronic commerce application 127 in case a question arises about a particular download. If the concealment mechanism is reversible, the electronic commerce application 127 can then reverse the concealed transaction identifier to obtain a meaningful transaction identifier, which can be used to further investigate a suspicious download request. If the concealment mechanism is not reversible, the electronic commerce application 127 can reverse the concealed transaction identifier to narrow the transaction identifier down to a set of possible transaction identifiers. This set can be used to further investigate a suspicious download request.

The flowchart of FIG. 4 described one particular sequence for processing a received download authorization code, suitable for use in conjunction with the download authorization code generated by the process described in connection with the flowchart of FIG. 3. However, it should be appreciated that other embodiments for processing a received download authorization code may combine these individual features in various ways, and even omit individual features, for suitable use in conjunction with other embodiments of a download code generation process.

Figure 5:
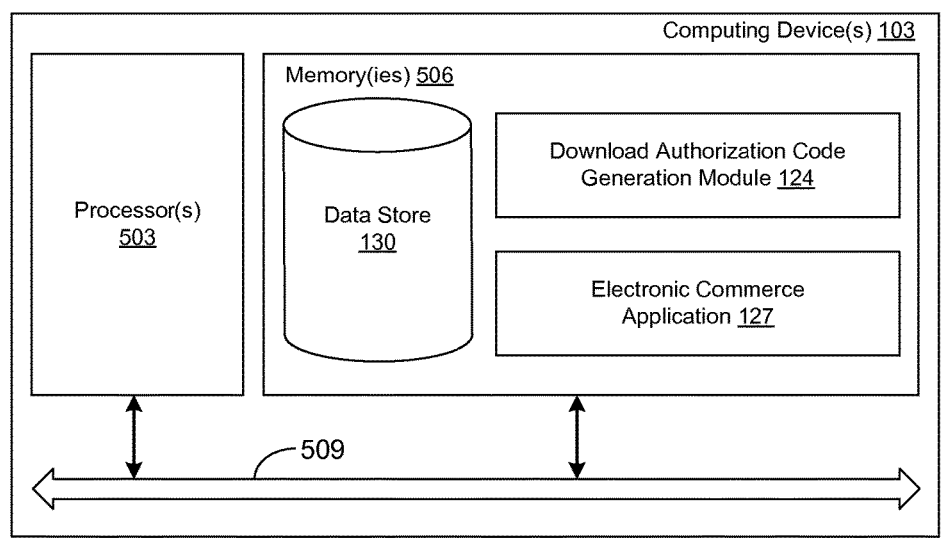
FIG. 5 is a schematic block diagram that provides one example illustration of a computing device employed in the networked environment of FIG. 1 according to various embodiments of the present disclosure.

Moving on to FIG. 5, shown is a schematic block diagram of the computing device 103 according to an embodiment of the present disclosure. The computing device 103 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the download authorization code generation module 124, the electronic commerce application 127, and potentially other applications. In addition, an operating system may be stored in the memory 506 and executable by the processor 503. While not illustrated, the computing device 103 (FIG. 1) also includes components like those shown in FIG. 4, whereby the browser 139 (FIG. 1) is stored in a memory and executable by a processor.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and executed by the processor 503, source code that may be expressed in proper format such as object code that is capable of being loaded into a random access portion of the memory 506 and executed by the processor 503, or source code that may be interpreted by another executable program to generate instructions in a random access portion of the memory 506 and executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors and the memory 506 may represent multiple memories that operate in parallel processing circuits, respectively. In such a case, the local interface 509 may be an appropriate network 109 (FIG. 1) that facilitates communication between any two of the multiple processors 503, between any of the processors 503 and any of the memories 506, or between any two of the memories 506, etc. The local interface 509 may comprise additional systems designed to coordinate this communication, including, for example, performing load balancing. The processor 503 may be of electrical or of some other available construction.

Although the download authorization code generation module 124, the electronic commerce application 127, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 3 shows the functionality and operation of an implementation of portions of the download authorization code generation module 124 and the electronic commerce application 127. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as one of the processors 503 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in the flowchart of FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein (including the download authorization code generation module 124 and the electronic commerce application 127) that comprises software or code can be embodied in any non-transitory computer-readable medium for use by or in connection with an instruction execution system such as, for example, the processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method comprising:
   obtaining, by a computing device, a transaction identifier corresponding to an acquisition of a digital product by a user; and
   generating, by the computing device, a download authorization code based at least in part on the transaction identifier by:
      concealing the transaction identifier by hashing the transaction identifier wherein a salt value used for a hash function for the hashing corresponds to a time of the transaction;
      combining the hashed transaction identifier with a fixed predetermined verification value that is uniquely associated with a network site through which the user acquired the digital product; and
      encrypting the combined transaction identifier to produce the download authorization code.

2. The method of claim 1, wherein the generating is performed in response to the obtaining of the transaction identifier.

3. The method of claim 1, wherein the obtaining comprises retrieving the transaction identifier from storage accessible to the computing device.

4. The method of claim 1, wherein the obtaining comprises receiving the transaction identifier from an electronic commerce network site through which the user acquired the digital product.

5. The method of claim 1, wherein the download authorization code limits the user to a predetermined number of downloads.

6. The method of claim 1, wherein the fixed predetermined verification value is uniquely associated with the digital product.

7. The method of claim 1, wherein the combining comprises a method selected from the group consisting of prefixing and concatenating.

8. The method of claim 1, wherein the generating further comprises:
   encoding the encrypted transaction identifier to produce the download authorization code.

9. The method of claim 1, the generating comprising:
   truncating the hashed transaction identifier; and
   wherein the combining further comprises prefixing the truncated transaction identifier with the fixed predetermined verification value.

10. The method of claim 1, wherein the generating, by the computing device, the download authorization code based at least in part on the transaction identifier further comprises:
    truncating the hashed transaction identifier;
    wherein the combining comprises prefixing the truncated transaction identifier with the fixed predetermined verification value; and
    encoding the encrypted transaction identifier to produce the download authorization code.

11. The method of claim 1, wherein the fixed predetermined verification value is associated with a predetermined subset of digital products.

12. A system, comprising:
    at least one computing device;
    a first module executed by the at least one computing device, the first module, when executed, causing the at least one computing device to at least:
       obtain a transaction identifier corresponding to an acquisition of a digital product by a user through a network site; and
       generate a download authorization code based at least in part on the transaction identifier and on a verification value by hashing the transaction identifier with a salt value corresponding to a time of the transaction, combining the transaction identifier with the verification value and encrypting the combined transaction identifier to produce the download authorization code, the verification value being fixed and predetermined, the verification value further being uniquely associated with the network site; and
    a second module executed by in the at least one computing device, the second module causing the at least one computing device to at least:
       provide the digital product to the user in response to a download request for the digital product and to a separate transaction that includes the generated download authorization code, wherein the generated download authorization code is received in a transaction related to the download request.

13. The system of claim 12, wherein the download authorization code provides non-repudiation of an entity that generated the download authorization code.

14. The system of claim 12, wherein the acquisition is selected from the group consisting of a purchase, a rental, and a free offer.

15. The system of claim 12, wherein the first module causes the at least one computing device to encode the encrypted combined transaction identifier to produce the download authorization code.

16. The system of claim 12, wherein the first module causes the at least one computing device to:
- truncate the hashed transaction identifier; and
- prefix the truncated transaction identifier with a fixed predetermined verification value to generate a prefixed transaction identifier.

17. The system of claim 12, wherein the verification value is associated with a predetermined subset of digital products.

18. A non-transitory computer-readable medium embodying a program executable in a computing device, the program, when executed, causing the computing device to at least:
- obtain a transaction identifier corresponding to an acquisition of a digital product by a user; and
- generate a download authorization code based at least in part on the transaction identifier by hashing the transaction identifier with a salt value corresponding to a time of the transaction, combining the transaction identifier with a fixed predetermined verification value and encrypting the combined transaction identifier to produce the download authorization code, wherein the fixed predetermined verification value is uniquely associated with a network site through which the user acquired the digital product and is associated with a predetermined subset of digital products.

19. The non-transitory computer readable medium of claim 18, wherein the download authorization code limits the user to a predetermined number of downloads.

20. The non-transitory computer readable medium of claim 18, wherein the download authorization code provides non-repudiation of an entity that generated the download authorization code.

* * * * *

UNITED STATES PATENT AND TRADEMARK OFFICE
CERTIFICATE OF CORRECTION

PATENT NO. : 10,262,310 B1
APPLICATION NO. : 13/227127
DATED : April 16, 2019
INVENTOR(S) : Lobb et al.

Page 1 of 1

It is certified that error appears in the above-identified patent and that said Letters Patent is hereby corrected as shown below:

In the Claims

At Column 12, Line 53, in Claim 12, delete:
"a second module executed by in the at least one computing device"
And replace with:
--a second module executed by the at least one computing device--

Signed and Sealed this
Twelfth Day of November, 2019

Andrei Iancu
*Director of the United States Patent and Trademark Office*